United States Patent [19]

Lampe et al.

[11] Patent Number: 5,722,228
[45] Date of Patent: Mar. 3, 1998

[54] STARTING SYSTEM FOR A GAS TURBINE ENGINE

[75] Inventors: Steven W. Lampe, Poway; Alan Greubel, San Diego, both of Calif.

[73] Assignee: Sundstrand Corporation, Rockford, Ill.

[21] Appl. No.: 279,968

[22] Filed: Jul. 25, 1994

[51] Int. Cl.⁶ ................................................ F02C 7/268
[52] U.S. Cl. ................................ 60/39.06; 60/39.142
[58] Field of Search ............................ 60/39.02, 39.06, 60/39.141, 39.142, 39.15, 413

[56] References Cited

U.S. PATENT DOCUMENTS

| | | | |
|---|---|---|---|
| 3,696,612 | 10/1972 | Berman | 60/39.14 |
| 3,786,696 | 1/1974 | Aleem | 74/687 |
| 3,965,673 | 6/1976 | Friedrich | 60/39.14 |
| 4,494,372 | 1/1985 | Cronin | 60/39.07 |
| 4,542,722 | 9/1985 | Reynolds | 123/179 |
| 5,069,032 | 12/1991 | White | 60/39.141 |

Primary Examiner—Timothy S. Thorpe
Attorney, Agent, or Firm—Ryan M. Fountain

[57] ABSTRACT

A hydraulic start system is provided having separate, sequentially started hydraulic motors for the controller PMG and for the gas turbine engine starter. Fluid pressure is provided by a hydraulic accumulator to both motors through separating valves. The PMG motor is supplied with fluid first and that drives the PMG to power up and initialize the controller before the starter motor is utilized. The engine itself is coupled to both the starter motor and the PMG through overrunning clutches such that starting the PMG does not start the engine. Once the controller is initialized, fluid is provided to the starter motor and the engine is accelerated through the light-off window and up to a self sustaining speed. As the engine accelerates, it couples with and drives the PMG, decoupling the PMG from its hydraulic motor and shutting off the fluid flow to that motor. Since the controller is fully initialized as the engine reaches the light-off window, effective ignition can occur and stable combustion is available thereafter.

4 Claims, 1 Drawing Sheet

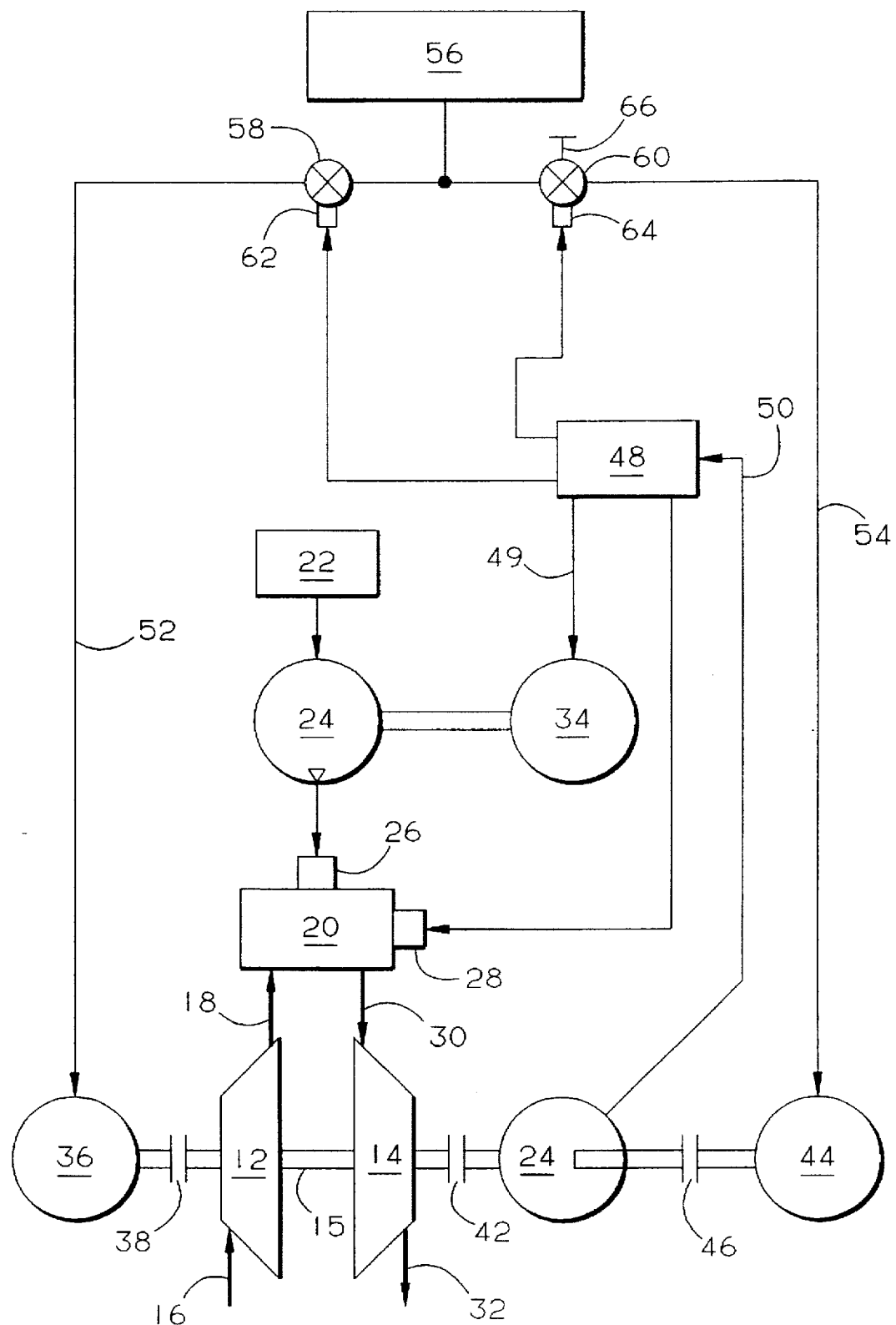

STARTING SYSTEM FOR A GAS TURBINE ENGINE

BACKGROUND AND SUMMARY OF THE INVENTION

Our invention relates generally to gas turbine engines and "black start" arrangements for starting such engines. This invention has application to aircraft and ground power systems, such as those used for portable refueling devices.

Gas turbine engines typically include ignition circuits and control systems having components which require electrical power in order to operate. In certain instances, however, it may be necessary to start the gas turbine engine without the aid of an external source of electrical power for such ignition and control system components. This is referred to as a "black start". The need to provide for such black start capability can occur, for example, in connection with military aircraft as well as with commercial or military ground power supplies. As an illustration, it has been suggested to use a gas turbine engine to power a remote site refueling apparatus having a bladder of fuel and a pump driven by the gas turbine engine. These refueling apparatus would be capable of being airlifted to remote locations and dropped by parachute into a hostile environment. Thus, the gas turbine engine starting system incorporated therein would need to be rugged, reliable, and capable of use over a wide range of environmental conditions.

To effectively light and start a gas turbine engine it must be supplied with fuel and ignition obtained during a certain speed range or "light-off window". That window can, for example, be between 5% and 15% of the rated engine speed. When a hydraulic system is used to start the engine, the engine can be accelerated through and beyond the light-off window in less than three seconds. In such start systems, the electric controller for the engine fuel pump can be boot-strapped by means of electric power from a hydraulically driven permanent magnet generator (PMG). However, the electric controller can require approximately three seconds of high power from the PMG to initialize itself and enable the required flow of fuel for ignition. Thus, when both the electric controller and the engine are started hydraulically in prior systems it has been found that proper ignition can fail to occur.

It has been suggested that additional electrical batteries could be employed to separately initialize the controller. However, use of batteries would require additional maintenance to verify its condition where units are stored for extended periods of time. Also, batteries may not be a reliable source of power in extreme temperature environments.

Thus, it is our objective with this invention to provide an improved method and apparatus for starting gas turbine engines. Further objectives include providing a gas turbine engine starting system which:

1. is lightweight, inexpensive to make and reliable in use,
2. does not require an external electrical power source,
3. is suitable for use in a wide variety of military and commercial applications for both aircraft and ground power,
4. is usable over a wide range of temperature and other environmental conditions, and
5. is capable of reliable use after long periods of storage or non-use.

These and other objects of our invention are obtained by the provision of a hydraulic start system having separate, sequentially started hydraulic motors for the controller PMG and for the gas turbine engine starter. Fluid pressure is provided by a hydraulic accumulator to both motors through separating valves. The PMG motor is supplied with fluid first and drives the PMG to power up and initialize the controller before the engine starter motor is utilized. The engine itself is coupled to both the engine starter motor and the PMG through overrunning clutches such that starting the PMG does not start the engine. Once the controller is initialized, fluid is provided to the starter motor and the engine is accelerated through the light-off window and up to a self sustaining speed. As the engine accelerates, it couples with and drives the PMG, decoupling the PMG from its hydraulic motor and shutting off the fluid flow to that motor. Since the controller is fully initialized as the engine reaches the light-off window, effective ignition can occur and stable combustion is available thereafter.

Other objects, advantages and novel features of our invention will now become readily apparent from the attached drawing and detail discussion that follows.

BRIEF DESCRIPTION OF THE DRAWING

The FIGURE shows a schematic representation of a gas turbine engine incorporating our invention.

DESCRIPTION OF PREFERRED EMBODIMENTS

The FIGURE illustrates a preferred embodiment of our invention and includes a gas turbine engine 10 of conventional design except with respect to the use of our invention. Engine 10 has, for example, a rotary compressor 12 coupled to a rotary turbine wheel 14 via shaft 15. Ambient air is supplied to compressor 12 via inlet 16 and discharged as compressed air via outlet 18 to fuel/air combustor 20. Fuel is provided to combustor 20 from fuel supply 22 by fuel pump 24 via injector structure 26, and the fuel/air mixture in combustor 20 is burned via igniter 28. The combustion gases are provided to turbine wheel 14 through nozzle 30 and thereafter passed to the environment via outlet 32. Fuel pump 24 may, for example, be driven by electric motor 34.

Our invention provides a means for reliably starting engine 10 and accelerating it until the engine is self sustaining as a result of the energy transfer from the combustion process. In that regard, hydraulic motor 36 is rotatably coupled to compressor 12 via shaft 15 through overrunning clutch ("ORC") 38. PMG 40 is also coupled to shaft 15, through ORC 42. Further, hydraulic motor 44 is coupled to PMG 40 through ORC 46.

PMG 40 provides electric power to controller 48 via line 50. Electric motor 34 receives control signals from controller 48 via line 49. Hydraulic motors 36 and 44 receive hydraulic fluid and pressure through lines 52 and 54, respectively, from accumulator 56 or a like source of hydraulic fluid under pressure. Separating valves 58 and 60 are included to control the flow of fluid from accumulator 56 through lines 52 and 54, respectively. Valves 58 and 60 have actuators 62 and 64, respectively, associated therewith. Those actuators are, for example, electrically driven and receive control signals from controller 48. Valve 60 can also include manual actuator 66.

In operation, motor 36 serves as the starter motor, and motor 44 serves as the PMG motor. Black start can, for example, be achieved by manual opening of valve 60 through actuator 66 to permit hydraulic fluid to flow through line 54 and start operation of hydraulic motor 44. PMG 40 is then rotated by motor 44 to produce electric power to controller 48. ORC 42 prevents rotation of compressor 12 as a result of rotation of PMG 40.

Once controller 48 is initialized, electric motor 34 is enabled to drive fuel pump 24 to supply fuel for combustion. In preferred embodiments, at that point controller 48 causes actuator 62 to open valve 58 to permit hydraulic fluid to flow through line 52 and start operation of motor 36 to drive compressor 12 through ORC 38. When the rotational speed of engine 10 reaches the light-off window, controller 48 will cause fuel to flow to injector structure 26 and, preferably, fire igniter 28 to begin burning of the fuel/air mixture in combustor 20. Determination of that rotational speed can be made by a conventional speed sensor associated with shaft 15 (not shown) providing signal inputs to controller 48.

As the rotational speed of engine 10 increases through the light-off window toward a self sustaining speed, engine 10 will begin to overrun hydraulic motor 36. At that point, preferably as detected by the conventional speed sensor, controller 48 will cause actuator 62 to close valve 58, shutting off the flow of fluid to hydraulic motor 36. Similarly, at a predeterminable rotational speed engine 10 can couple with and begin to drive PMG 40 through ORC 42. At that point PMG 40 is decoupled from hydraulic motor 44 by ORC 46 and (again preferably through the speed sensor) controller 48 will cause actuator 64 to close valve 60, shutting off the flow of fluid to hydraulic motor 44. Thereafter, engine 10 can drive PMG 40 in a conventional manner.

Thus, our invention uses motors 36 and 44 separately to start the engine and the PMG, as well as sequentially to accommodate the different responsiveness of those components so as to achieve a coincidence of optimum ignition conditions during the light-off window. The particular speeds of engine rotation and timing requirements of specific embodiments can be predetermined and programmed into controller 48 by conventional methods. The uncoupling speeds for motors 36 and 44 may, in some applications, be substantially the same. For many applications it will be desirable to start the PMG before starting the engine, but our invention has application also where the reverse sequence is needed. This invention does not preclude use of additional conventional features, such as a bleed air vent off of compressor 12, which can, for example, be used to drive a pump to recharge accumulator 56 after engine 10 has been started. Alternatively, accumulator 56 can include a manual charging structure. Further, as another alternative, our invention can be readily adapted to permit the engine to be started by an external power source using the same PMG.

The invention may also be utilized with advantage where the stored source of mechanical energy, the means for rotating the engine up to speed, and/or the means for converting the stored mechanical energy into electric energy are not hydraulic. For example, accumulator 56 could provide pneumatic power to pneumatic motors 44,36 for driving PMG 40, and for starting engine 10. A combination of hydraulic, pneumatic, or other mechanically driven devices for storing and converting mechanical energy can also be utilized in practicing our invention.

Thus, our invention can be used in aircraft as well as ground power devices and is not particularly sensitive to the environmental conditions in which that use occurs since the stored mechanical energy which drives the motors is relatively stable in that regard. Although the present invention has been described above in detail with regard to specific embodiments, the same is by way of illustration and example only, and is not to be considered as a limitation. The spirit and scope of our invention is limited only by the terms of the following claims.

What we claim is:

1. In a gas turbine engine comprising:

a combustor chamber, a compressor, mounted on a rotatable shaft, for supplying compressed gas to said combustion chamber, a supply of fuel, a controller for provision of said fuel to said combustion chamber, driving means for permitting the rotation of said shaft to supply power to said controller when combustion of fuel within said combustion chamber is self sustaining, and hydraulic means for starting rotation of said shaft, including a source of hydraulic fluid and a first hydraulic motor driven by said hydraulic fluid, a starting means is provided for separately initializing said controller, said starting means comprising:

a second hydraulic motor connected to said source of hydraulic fluid for receiving said fluid independently from the provision of said fluid to said first hydraulic motor, and connecting means for selectively joining said second hydraulic motor to said driving means for supplying power to said controller prior to rotation of said shaft.

2. The apparatus of claim 1 wherein said hydraulic means includes a valve between said source of hydraulic fluid and said first hydraulic motor for controlling the flow of fluid to that motor, and said controller is adapted to actuate that valve to permit fluid flow subsequent to the provision of power to said controller by said connecting means.

3. A method of operating a gas turbine engine having a combustor for receiving compressed gas and fuel, a controller for the provision of fuel to that combustor, a compressor for the provision of compressed gas to that combuster, a hydraulic motor for starting said compressor and a source of hydraulic fluid for starting said hydraulic motor, comprising the steps of:

first using a portion of said hydraulic fluid to initialize and enable said controller, and then using a portion of said hydraulic fluid to start said hydraulic motor.

4. The method according to claim 3 wherein after ignition within said combuster, the flow of said hydraulic fluid to said hydraulic motor and for initializing said controller is discontinued.

* * * * *